United States Patent
Shiraga (10) Patent No.: US 9,134,932 B2
(45) Date of Patent: Sep. 15, 2015

(54) USER SELECTION OF A FILE FORMAT PRIOR TO A PRINT PREVIEW

(75) Inventor: Naoto Shiraga, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 81 days.

(21) Appl. No.: 13/408,938

(22) Filed: Feb. 29, 2012

(65) Prior Publication Data

US 2012/0246566 A1  Sep. 27, 2012

(30) Foreign Application Priority Data

Mar. 25, 2011  (JP) ................. 2011-069003

(51) Int. Cl.
*G06F 17/00* (2006.01)
*G06F 3/12* (2006.01)
*H04M 1/725* (2006.01)

(52) U.S. Cl.
CPC ............ *G06F 3/1206* (2013.01); *G06F 3/1205* (2013.01); *G06F 3/1247* (2013.01); *G06F 3/1256* (2013.01); *G06F 3/1292* (2013.01); *H04M 1/72522* (2013.01)

(58) Field of Classification Search
CPC .... G06F 3/1247; G06F 3/1292; G06F 3/1256
See application file for complete search history.

(56) References Cited

U.S. PATENT DOCUMENTS

| | | | |
|---|---|---|---|
| 2002/0021310 A1* | 2/2002 | Nakai et al. | 345/837 |
| 2003/0096581 A1 | 5/2003 | Takamine | |
| 2003/0174357 A1* | 9/2003 | Lester et al. | 358/1.15 |
| 2004/0003121 A1 | 1/2004 | Tanimoto | |
| 2004/0205636 A1 | 10/2004 | Kasahara et al. | |
| 2004/0253990 A1* | 12/2004 | McCoog et al. | 455/566 |
| 2006/0066899 A1 | 3/2006 | Yoshida | |

(Continued)

FOREIGN PATENT DOCUMENTS

| | | |
|---|---|---|
| JP | 2001-216113 A | 8/2001 |
| JP | 2002-373215 A | 12/2002 |

(Continued)

OTHER PUBLICATIONS

Japan Patent Office, Notification of Reason for Refusal for Japanese Patent Application No. 2011-069003 (counterpart Japanese patent application), dispatched Mar. 12, 2013.

(Continued)

*Primary Examiner* — Scott Baderman
*Assistant Examiner* — Asher Kells
(74) *Attorney, Agent, or Firm* — Merchant & Gould PC (57) ABSTRACT

An information processing apparatus includes: a reception unit receiving whether to print a first-kind data item or a second-kind data item; a storing unit storing a plurality of the first-kind data items in association with a data name; an acquiring unit acquiring the first-kind data item from the storing unit; a transmission control unit transmitting the acquired fist-kind data item if the reception unit receives the print of the first-kind data item; a second-kind data storage control unit storing, in the storing unit, the second-kind data item, which is a converted data item of the transmitted first-kind data item, in association with the data name of the transmitted first-kind data item; and a first display control unit displaying a display image including an image generated from the second-kind data item stored in the storing unit and an image representing the data name corresponding to the second-kind data item.

14 Claims, 9 Drawing Sheets

(56) References Cited

U.S. PATENT DOCUMENTS

| | | | |
|---|---|---|---|
| 2006/0224937 A1* | 10/2006 | Sudoh et al. | 715/500 |
| 2008/0137126 A1 | 6/2008 | Yoshida | |
| 2009/0043905 A1 | 2/2009 | Aoki et al. | |
| 2009/0103124 A1* | 4/2009 | Kimura et al. | 358/1.15 |
| 2010/0118344 A1 | 5/2010 | Asano | |
| 2012/0113461 A1* | 5/2012 | Tsuchida | 358/1.15 |
| 2012/0243048 A1 | 9/2012 | Asai | |

FOREIGN PATENT DOCUMENTS

| | | |
|---|---|---|
| JP | 2003-167697 A | 6/2003 |
| JP | 2003-308312 A | 10/2003 |
| JP | 2005-018411 A | 1/2005 |
| JP | 2006-111799 A | 4/2006 |
| JP | 2006-235735 A | 9/2006 |
| JP | 2007-018316 A | 1/2007 |
| JP | 2007-245500 A | 9/2007 |
| JP | 2009-077283 A | 4/2009 |
| JP | 2009-145974 A | 7/2009 |
| JP | 2009-151468 A | 7/2009 |

OTHER PUBLICATIONS

Yoshida, Hidetoshi, In-Depth Explanation of Cutting-Edge Technology of DTP, DTP Technology File, Professional DTP, Japan, Kohgaku-Sha Co., Ltd., Jun. 1, 2002, Jun. 2002 Edition, First Issue, pp. 84 to 88.

Office Action issued in related Japanese Patent Application No. 2011-068995, mailed Apr. 9, 2013.

Office Action issued in related U.S. Appl. No. 13/358,458, mailed Jun. 6, 2014.

Office Action issued in related U.S. Appl. No. 13/358,458, mailed Dec. 16, 2014.

U.S. Office Action issued in related application U.S. Appl. No. 13/358,458, mailed Jul. 9, 2015.

* cited by examiner

PROCESS IN PORTABLE TERMINAL ( PDF DISPLAY PROCESS ) — S410

↓ S601
READ DATA NAME OF PDF DATA ITEM

↓ S602
STORE DATA NAME

↓ S603
START PDF CONVERSION PROCESS

↓ S604
DISPLAY PDF DISPLAY SCREEN

↓ S605
DISPLAY DATA NAME OF PDF DATA ITEM

↓ S606
LOAD DISPLAY PAGE

↓ S607
IS THERE CONVERTED PAGE TO BE DISPLAY PAGE? — NO

↓ YES S608
DISPLAY CURRENT PAGE PRINT BUTTON

↓ S609
ARE THERE CONVERTED PAGES OF ALL PAGES? — NO

↓ YES S610
DISPLAY FULL PAGE PRINT BUTTON

↓ S611
HAS PAGE SWITCH INSTRUCTION BEEN INPUT?
YES → (loop back to S605)
NO → (loop back to S609)

USER SELECTION OF A FILE FORMAT PRIOR TO A PRINT PREVIEW

CROSS-REFERENCE TO RELATED APPLICATION

This application is based upon and claims the benefit of priority of Japanese Patent Application No. 2011-069003 filed on Mar. 25, 2011, the contents of which are incorporated herein by reference in its entirety.

BACKGROUND

The present disclosure relates to a computer readable recording medium storing an information processing program, an information processing apparatus, and an information processing method.

There has been known an apparatus which displays a preview screen including a print image of a file selected by a user, a print option button, and a print button, and prints the file of the print image if receiving an input by the print button on the preview screen.

SUMMARY

Here, in a case where a file name that the user knows is changed for the reasons of an internal process of the apparatus, if the changed file name is displayed on the preview screen, the user does not know the changed file name displayed on the preview screen, and thus the user may be given a feel of strangeness.

An aspect of the present disclosure was made in order to solve the above-motioned problem, and an object of the present disclosure is to provide an information processing program, an information processing apparatus, and an information processing method which make a user to visibly recognize a data name of data which is a source of a display image such that it is difficult that the user is given a feeling of strangeness.

The aspect of the present disclosure provides the following arrangements:

A non-transitory computer readable recording medium storing an information processing program to be executed by a computer of an information processing apparatus including a transmitting unit, a receiving unit, a storing unit storing a plurality of first-kind data items stored therein in association with a data name, a reception unit for receiving whether to print the first-kind data item which is a data item of a first format or the second-kind data item which is a data item of a second format, and a display unit, the information processing program comprising:

a transmission control instruction that causes, if the reception unit receives the print of the first-kind data item, the transmitting unit to transmit the fist-kind data item from the storing unit;

a second-kind data storage control instruction that causes the storing unit to store the second-kind data item, which is received by the receiving unit and is a converted data item of the first-kind data item transmitted by the transmitting unit, in association with the data name of the first-kind data item transmitted by the transmitting unit; and a first display control instruction that causes the display unit to display a display image including an image generated from the second-kind data item stored in the storing unit and an image representing the data name, corresponding to the second-kind data item, of the data names of the first-kind data items.

An information processing apparatus comprising:

a reception unit configured to receive whether to print a first-kind data item which is a data item of a first format or a second-kind data item which is a data item of a second format;

a storing unit configured to store a plurality of the first-kind data items in association with a data name;

an acquiring unit configured to acquire the first-kind data item from the storing unit;

a transmission control unit configured to transmit the fist-kind data item acquired by the acquiring unit if the reception unit receives the print of the first-kind data item;

a second-kind data storage control unit configured to store, in the storing unit, the second-kind data item, which is received by a receiving unit and is a converted data item of the first-kind data item transmitted by the transmitting unit, in association with the data name of the first-kind data item transmitted by the transmitting unit; and a first display control unit configured to display a display image including an image generated from the second-kind data item stored in the storing unit and an image representing the data name, corresponding to the second-kind data item, of the data names of the first-kind data items.

An information processing method which is performed in an information processing apparatus including a receiving unit, a storing unit storing a plurality of first-kind data items stored therein in association with a data name, a reception unit for receiving whether to print the first-kind data item which is a data item of a first format or the second-kind data item which is a data item of a second format, and a display unit, the method comprising:

transmitting the fist-kind data item from the storing unit if the reception unit receives the print of the first-kind data item;

storing the second-kind data item, which is received by the receiving unit and is a converted data item of the first-kind data item transmitted by the transmitting unit, in association with the data name of the transmitted first-kind data item; and displaying, on the display unit, a display image including an image generated from the second-kind data item stored in the storing unit and an image representing the data name, corresponding to the second-kind data item, of the data names of the first-kind data items.

DESCRIPTION OF EXEMPLARY EMBODIMENTS

Figure 1:
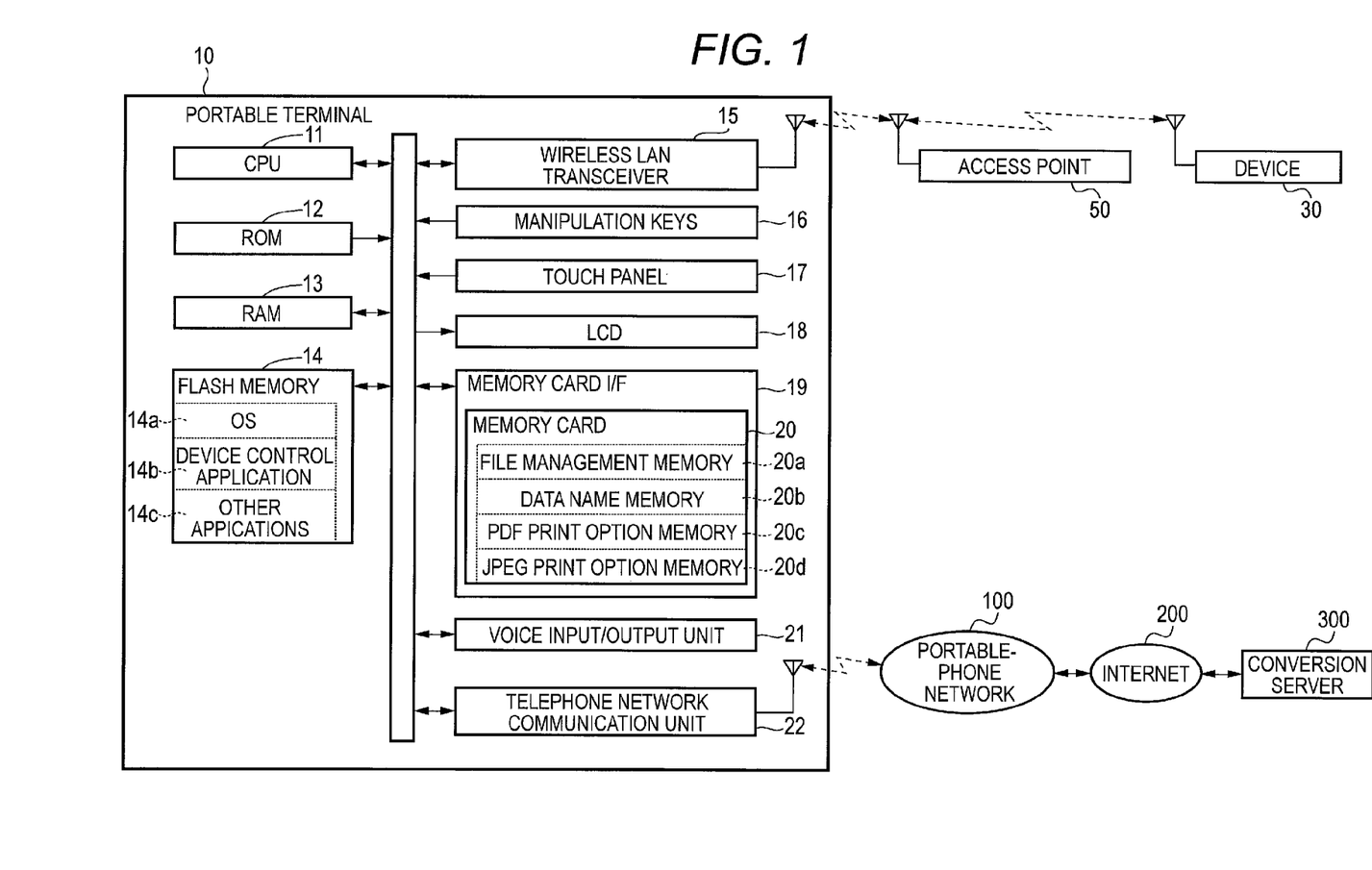
FIG. 1 is a block diagram illustrating an electrical configuration of a portable terminal including a device control application according to an embodiment.

Hereinafter, an embodiment will be described with reference to the accompanying drawings. FIG. 1 is a block diagram illustrating an electrical configuration of a portable terminal 10 having a device control application 14b installed therein, according to an embodiment.

The portable terminal 10 is a portable phone that can make a voice call with another device or use the Internet 200, through a portable-phone network 100. The portable terminal 10 includes a CPU 11, a ROM 12, a RAM 13, a flash memory 14, a wireless LAN transceiver 15, manipulation keys 16, a touch panel 17, an LCD 18, a memory card interface 19 (hereinafter, referred to as a memory card I/F 19), a voice input/output unit 21, and a telephone network communication unit 22. These components are connected to one another through bus lines 23.

The CPU 11 controls each of the units connected to the bus lines 23, in accordance with fixed values, programs, and the like stored in the ROM 12 or the like. The ROM 12 is a non-volatile memory which is not rewritable, and the RAM 13 is a volatile memory which is rewritable. The flash memory 14 is a non-volatile memory which is rewritable, and stores an operating system 14a (hereinafter, referred to as an OS 14a), the device control application 14b, and the other applications 14c.

Hereinafter, the CPU 11 which executes a program such as an application, the operating system, or the like may be referred to as simply the name of the program. For example, a term 'application' may mean 'the CPU 11 that executes an application'.

The OS 14a is basic software for implementing the standard functions of the portable terminal 10, and is an Android (registered as a trademark) OS in the present embodiment.

The device control application 14b is an application for enabling a user to use a printing function of a device 30, directly from the portable terminal 10, without passing through a personal computer or the like. The portable terminal 10 executes the device control application 14b to transmit a PDF format file (hereinafter, referred to as PDF data) to a conversion server 300, makes the conversion server 300 convert the PDF data into a JPEG format file (hereinafter, referred to as JPEG data), and makes a liquid crystal display 18 (hereinafter, referred to as an LCD 18) display preview images or instructs the device 30 to perform printing, on the basis of the JPEG data.

Particularly, when making the LCD 18 displays the preview images generated on the basis of the JPEG data, the device control application 14b makes the LCD 18 display the preview images together with a data name of the PDF data that is the source of the JPEG data, so as not to give the user a feeling of strangeness.

The device control application 14b is a program for outputting a print instruction from the portable terminal 10 to the device 30. Examples of the other applications 14c include a browser, an E-mail application, a camera application, or the like installed in the portable terminal 10.

In the following description, the device control application 14b is referred to as a present application 14b, and the present application 14b and the other applications 14c are referred to collectively as "applications".

Each application calls the API of the OS 14a, and outputs data for each component of the portable terminal 10, such as the wireless LAN transceiver 15, the manipulation keys 16, the touch panel 17, the LCD 18, the memory card I/F 19, the voice input/output unit 21, and the telephone network communication unit 22, to the OS 14a. In other words, each application controls each component of the portable terminal 10 by calling the API of the OS 14a.

Further, each application calls the API of the OS 14a, and acquires data output from each component of the portable terminal 10, and data representing a status of each component, from the OS 14a. That is, each application acquires data representing a status of each component of the portable terminal 10 (including a status of manipulation input to the portable terminal 10), from the OS 14a, by calling the API of the OS 14a.

The OS 14a may notify the data which each component of the portable terminal 10 outputs, and the data representing the status of each component, to each application, regularly or whenever the status of each component changes. In other words, each application acquires the data representing the status of each component of the portable terminal 10 (including the status of the manipulation input to the portable terminal 10), from the OS 14a, by receiving the notification from the OS 14a.

The wireless LAN transceiver 15 is a circuit for wirelessly connecting the portable terminal 10 and the device 30 in an infrastructure mode through an access point 50 by a wireless LAN based on the standards of IEEE 802.11b and 802.11g. The manipulation keys 16 are hard keys provided to the housing of the portable terminal 10. The touch panel 17 is provided to overlap the LCD 18, and is for inputting option information and instructions to the portable terminal 10. The LCD 18 displays various screens such as the PDF display screen (see FIGS. 2A to 2D and 3A to 3F). The memory card I/F 19 is an interface for installing a non-volatile memory card 20.

The memory card 20 may be an SD card (registered as a trademark). In the present embodiment, the memory card 20 includes a file management memory 20a, a data name memory 20b, a PDF print option memory 20c, and a JPEG print option memory 20d.

In the file management memory 20a, for example, data downloaded from the Internet 200 or the like is stored. In the data name memory 20b, the data name of PDF data designated as object data for a print process from among PDF data stored in the file management memory 20a is stored. In the PDF print option memory 20c, print operation values be applied for printing PDF data is stored, and in the JPEG print option memory 20d, print option values to be applied for printing JPEG data is stored.

The voice input/output unit 21 is a unit for voice input and output that includes a microphone, a speaker, and so on, and the telephone network communication unit 22 is a circuit for performing communication through the portable-phone network 100. The portable-phone network 100 is a communication network based on international mobile telecommunication-2000 (IMT-2000), and is connected to the Internet 200 through a gateway (not shown) so as to enable use of the Internet 200 through the portable terminal 10. The conversion server 300 provides a service for converting PDF data received from the portable terminal 10 into JPEG data, and returning the JPEG data to the portable terminal 10.

The device 30 includes a wireless LAN transceiver (not shown) having the same configuration as that of the wireless LAN transceiver 15 of the portable terminal 10, and makes a Wi-Fi connection with the portable terminal 10 by wireless communication through the access point 50. Further, the device 30 prints images on the basis of JPEG data received from the portable terminal 10.

Figure 2A:
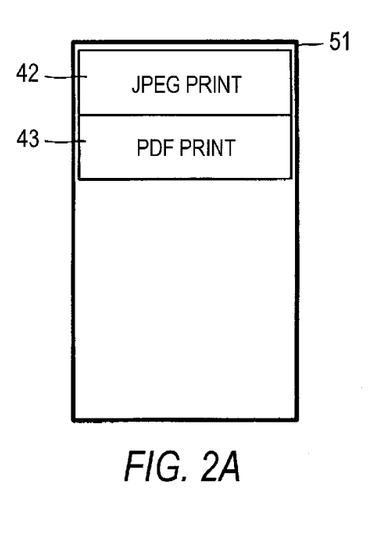
FIGS. 2A to 2D are views illustrating screen transition on an LCD of the portable terminal.

FIGS. 2A to 2D are views for explaining screen transitions after the present application 14b is activated until a JPEG print option screen 57 is displayed. FIG. 2A is a view illustrating an example of a use selection menu screen 51. The use selection menu screen 51 is a screen which is displayed in a case where the present application 14b is activated by the OS 14a, and is configured to include JPEG print 42 and PDF print 43. The JPEG print 42 is for instructing JPEG data print, and the PDF print 43 is for instructing PDF data print. If the user touches the JPEG print 42, the present application 14*b* switches the use selection menu screen 51 to a JPEG selection screen 52 of FIG. 2B.

Figure 2B:
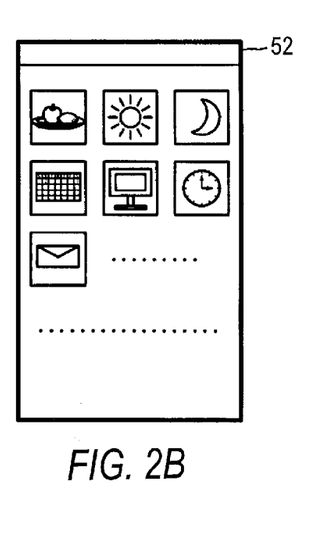

FIG. 2B is a view illustrating an example of the JPEG selection screen 52. The JPEG selection screen 52 is a screen including a list of thumbnails of JPEG data items stored in the memory card 20. If the user touches one thumbnail of the thumbnail list, the present application 14*b* switches the JPEG selection screen 52 to a JPEG display screen 53 of FIG. 2C.

Figure 2C:
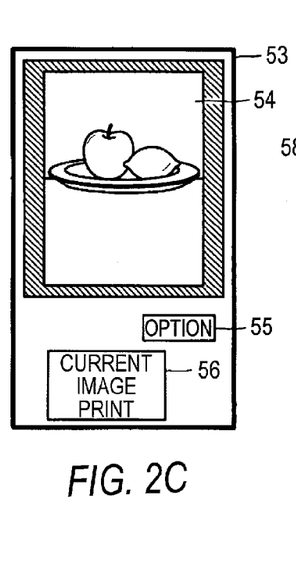

FIG. 2C is a view illustrating an example of the JPEG display screen 53. The JPEG display screen 53 is a screen which displays a JPEG preview image 54 of the JPEG data item selected on the JPEG selection screen 52 so as to enable the user to confirm the print object before printing.

The JPEG display screen 53 is configured to include the JPEG preview image 54, an option button 55, and a current image print button 56. The JPEG display screen 53 does not display any data name, unlike a PDF display screen 65 (to be described below). This is because the JPEG preview image 54 is selected from the thumbnails of the JPEG selection screen 52 (FIG. 2B) and so there is little need to display the data name of the selected JPEG data item together with the JPEG preview image 54.

The JPEG preview image 54 is an image which is generated from the JPEG data item designated from the thumbnail list. In a case of making the device 30, which is an instruction object, print the JPEG data item, if the device 30 is an inkjet printer, the present application 14*b* makes the device 30 perform printing without a margin, and if the device 30 is a laser printer, the present application 14*b* makes the device 30 perform printing with a margin.

Therefore, in a case where the device 30, which is the instruction object, is an inkjet printer, as shown in FIG. 2C, it is preferable to display a JPEG preview image 54 without a margin. Meanwhile, in a case where the device 30 is a laser printer, it is preferable to display a JPEG preview image with a margin.

The current image print button 56 is an object for receiving a print instruction, and if a print instruction is received by the current image print button 56, the present application 14*b* determines the JPEG data item corresponding to the currently displayed JPEG preview image 54, as a print object, and instructs the device 30 to print the corresponding JPEG data item.

The option button 55 is an object for receiving a change in the print option values. If the option button 55 is touched, the present application 14*b* transitions the JPEG display screen 53 displayed in the foreground, to a JPEG print option screen 57 (FIG. 2D).

Figure 2D:
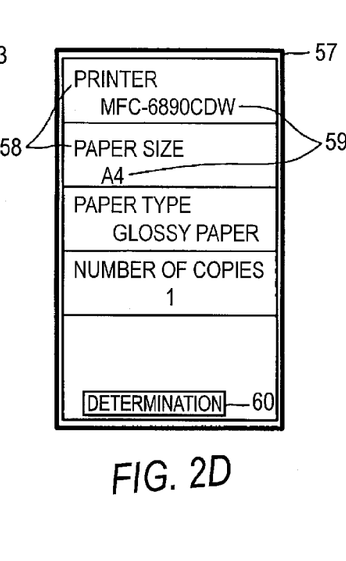

FIG. 2D is a view illustrating an example of the JPEG print option screen 57. The JPEG print option screen 57 is a screen for receiving print option values, and includes various print option items 58, option values 59 set for the option items 58, and a determination button 60 for determining the option values 59. If the user touches the determination button 60, the present application 14*b* stores the option values 59 in the JPEG print option memory 20*d*, and displays the JPEG display screen 53 again.

Figure 3A:
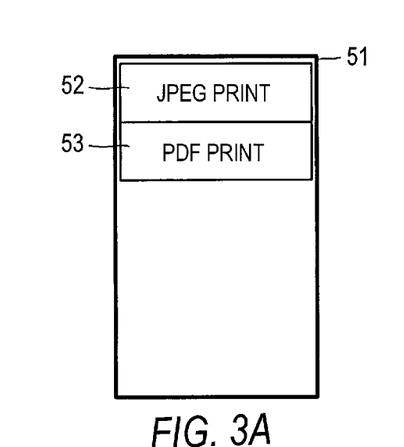
FIGS. 3A to 3F are views illustrating screen transitions on an LCD of the portable terminal.

FIGS. 3A to 3F are views for explaining screen transitions after the present application 14*b* is activated until a PDF print option screen 74. FIG. 3A is a view illustrating an example of the use selection menu screen 51, like FIG. 2A. If the user touches the PDF print 43 on the use selection menu screen 51, the present application 14*b* displays a PDF selection screen 62 of FIG. 3B.

Figure 3B:
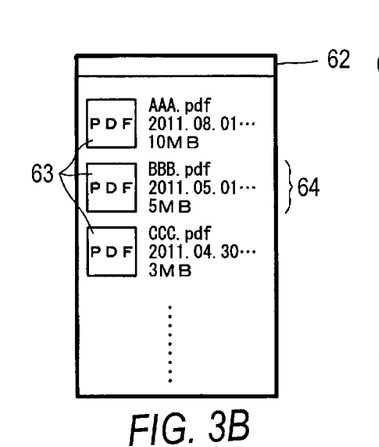

FIG. 3B is a view illustrating an example of the PDF selection screen 62. The PDF selection screen 62 is a screen including a list of the data names of PDF data items stored in the memory card 20. Each PDF data item is configured to include an icon 63 representing that the corresponding data item is a PDF data item, and file information 64. The icon 63 is a mark common to the individual PDF data items, and the file information 64 is configured to include the data name, generation date and time, and volume of the corresponding PDF data item.

The user selects one PDF data item, that is, one file, on the PDF selection screen 62, on the basis of the file information 64 of the individual PDF data items. Meanwhile, the above-mentioned JPEG selection screen 52 shown in FIG. 2B does not show the data name of each JPEG data item, and the user selects one JPEG data item on the basis of the contents of the individual thumbnails on the JPEG selection screen 52. If the user touches one PDF data item, the present application 14*b* displays the PDF display screen 65 of FIG. 3C.

Figure 3C:
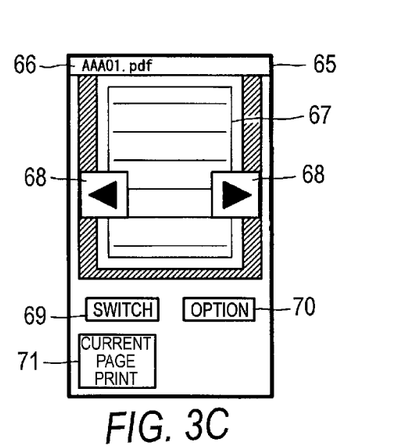
Figure 3D:
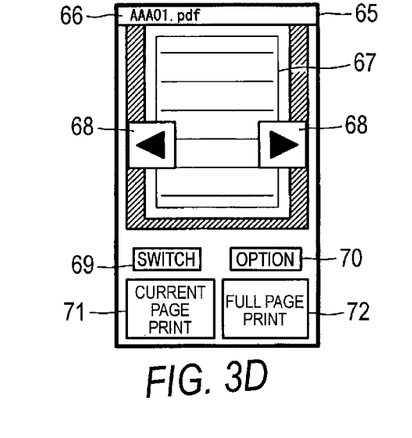
Figure 3E:
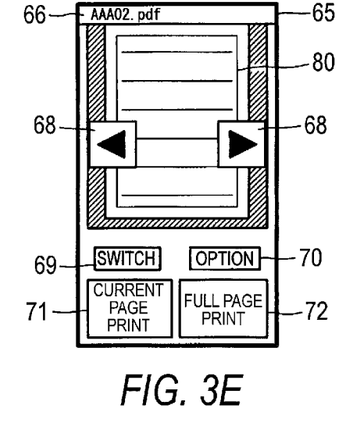

FIGS. 3C to 3E are views illustrating examples of the PDF display screen 65. The PDF display screen 65 is a screen which displays the PDF data item selected on the PDF selection screen 62 so as to enable the user to confirm the print object before printing.

The PDF display screen 65 shown in FIG. 3C is configured to include a data name 66, a PDF preview image 67, page switch buttons 68, a PDF switch button 69, an option button 70, and a current page print button 71.

The PDF preview image 67 is an image corresponding to one page data of the PDF data item, and is an image actually generated from a JPEG data item. The present application 14*b* displays the PDF preview image 67 generated from the JPEG data item together with the data name 66 of the PDF data item, so as not to give the user a feeling of strangeness.

The data name 66 represents the data name of the PDF data item selected on the PDF selection screen 62, and is displayed, for example, as 'AAA01.pdf'. The user can recognize the data name of the designated PDF data item from the portion 'AAA', and recognize a page number represented by the PDF preview image 67, from the portion '01'. Therefore, even if the PDF preview image 67 is an image generated from the JPEG data item, it is difficult for the PDF preview image 67 to give the user a feeling of strangeness. Further, since the data name 66 includes the extension 'pH', it is possible to make the PDF preview image 67 look as if it has been displayed on the basis of the PDF data item, and thus it is difficult for the PDF preview image 67 to give the user a feeling of strangeness.

The PDF preview image 67 is selected on the PDF selection screen 62, on the basis of the file information 64 of the PDF data items. Nevertheless, as the PDF preview image 67, the image generated from the JPEG data, not from the PDF data item, is displayed.

In this case, if the PDF preview image 67 is displayed without the data name 66 or the PDF preview image 67 is displayed with a data name assigned to the JPEG data regardless of the data name of the PDF data item, the PDF preview image 67 gives the user a feeling of strangeness. For this reason, on the PDF display screen 65, the PDF preview image 67 is displayed with the data name 66 of the PDF data item.

The PDF display screen 65 is configured to include the data name 66, whereas the JPEG display screen 53 shown in FIG. 2C does not include a component corresponding to the data name 66. In other words, the PDF display screen 65 and the JPEG display screen 53 are different from each other in their display formats. Therefore, the user can sensuously recognize the difference between the PDF display screen 65 and the JPEG display screen 53.

In a case where a print object data item is a PDF data item, the present application 14b makes the device 30 print the print object data item with a margin at the edge of an image. Therefore, it is preferable to generate a PDF preview image 67 with a margin, from a JPEG data item, and to display the PDF preview image 67 on the LCD 18, as shown in FIG. 3C.

The page switch buttons 68 are objects for receiving an instruction for switching to another PDF preview image 67 which is a display object. Here, the PDF format is a format capable of storing data of a plurality of pages in one file unit.

Meanwhile, the JPEG format is a format capable of data of one page in one file unit. Actually, PDF preview images 67 generated on the basis of JPEG data are displayed. However, it is possible to display the page switch buttons 68 and sequentially switch PDF preview images 67 which are display objects, in the page order, such that the user feels as if the user is browsing data of a plurality of pages, and operability is good.

The PDF switch button 69 is a button which is displayed in a case where a plurality of PDF data items is selected on the PDF selection screen 62, and is an object for receiving an instruction for switching to another PDF data item which is a display object. If the PDF switch button 69 is touched, the currently displayed JPEG preview image 67 is switched to another PDF preview image 67 of a page included in another PDF data item which has been selected on the PDF selection screen 62 and is different from the PDF data item including the page of the currently displayed PDF preview image 67.

Figure 3F:
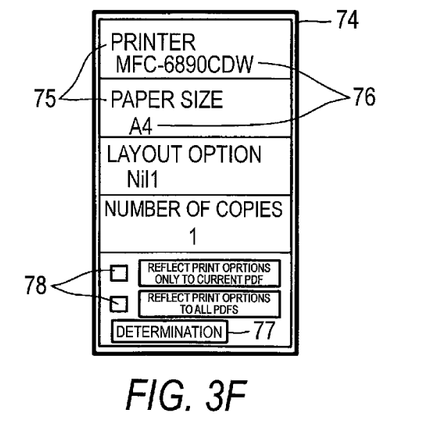

The option button 70 is an object for receiving a change in print option values. If the option button 70 is touched, the present application 14b transitions the PDF display screen 65 displayed in the foreground, to the PDF print option screen 74 (FIG. 3F).

The current page print button 71 is an object for receiving an instruction for printing the currently displayed PDF preview image 67. If a print instruction is received by the current page print button 71, the present application 14b determines the JPEG data item used for generating the currently displayed PDF preview image 67, as a print object, and instructs the device 30 to print the currently displayed PDF preview image 67.

The PDF display screen 65 shown in FIG. 3D is the same screen as the PDF display screen 65 shown in FIG. 3C except that the PDF display screen 65 shown in FIG. 3D includes a full page print button 72. The full page print button 72 is an object for receiving an instruction for printing all of a plurality of pages in a case where the plurality of pages is included the PDF data item which is the source of the currently displayed PDF preview image 67.

In a case where a print instruction is received by the full page print button 72, the present application 14b determines the JPEG data item used for generating the currently displayed PDF preview image 67 and the other JPEG data items used for generating the PDF data item including the currently displayed PDF preview image 67, as print objects, and instructs the device 30 to print all of the JPEG data items. Therefore, even if a PDF data item which is one file is generated from a plurality of files of JPEG data items, it is possible to simply instruct the device 30 to print all of the JPEG data items of the plurality of files.

The full page print button 72 is displayed after the current page print button 71 is displayed. This is because, in a case where an original PDF data item is composed of a plurality of pages, a time period is required until JPEG data items of the individual pages are received from the server 300. In other words, after the JPEG data items of all the pages are received from the server 300, the full page print button 72 is displayed to enable the function of the full page print button 72. Therefore, it is possible to prevent misleading information from being given to the user.

The PDF display screen 65 shown in FIG. 3E is a screen which is displayed in a case where a page switch button 68 (on the right side) is touched on the PDF display screen 65 shown in FIG. 3D. In this case, the PDF preview image 67 (the first page of the PDF data item) shown in FIG. 3D is switched to a PDF preview screen 80 (the second page of the PDF data item) shown in FIG. 3E.

Further, the data name 66 is switched from 'AAA01.pdf' shown in FIG. 3D to 'AAA02.pdf' shown in FIG. 3E. Therefore, the user can recognize that the PDF preview image 80 shown in FIG. 3E shows the second page of the PDF data item.

FIG. 3F is a view illustrating an example of the PDF print option screen 74. The PDF print option screen 74 is a screen for receiving print option values, and includes various print option items 75, option values 76, and a determination button 77. If any one of the option items 75 is touched, the present application 14b displays candidates settable as the option value 76 for the corresponding option item 75, so as to enable the user to select any one of the candidates.

The PDF print option screen 74 further includes the determination button 77 and check boxes 78. The check boxes 78 are for enabling the user to select an application range of the option values 76. When there is a check mark displayed in a check box 78 on whether to reflect the option values 76 only to the current PDF data item, if the user touches the determination button 77, the present application 14b performs the next process.

In other words, the present application 14b stores the option values 76 in the PDF print option memory 20c in association with the JPEG data item corresponding to the PDF preview image 67 displayed on the PDF display screen 65, and the other JPEG data items associated with the currently displayed PDF preview image 67 (all JPEG data items associated with the data name of the PDF data item), and displays the PDF display screen 65 again.

Therefore, if a print instruction is received on a PDF display screen 65 by the full page print button 72, the present application 14b can simply set the same option values 76 for all of the JPEG data item used for generating the currently displayed PDF preview image 67, and the other JPEG data items used for generating the PDF data item including the currently displayed PDF preview image 67.

The full page print button 72 is displayed after the current page print button 71 is displayed. This is because, in a case where an original PDF data item is composed of a plurality of pages, a time period is required until JPEG data items of the individual pages are received from the server 300. In other words, after the JPEG data items of all the pages are received from the server 300, the full page print button 72 is displayed to enable the function of the full page print button 72. Therefore, it is possible to prevent misleading information from being given to the user.

Meanwhile, when there is a check mark displayed in a check box 78 on whether to reflect the option values 76 to all PDF data items, if the user touches the determination button 77, the present application 14b stores the option values 76 in the PDF print option memory 20c, regardless of the data names, and displays the PDF display screen 65 again.

The PDF print option screen 74 includes the option items 75 different from those of the above-mentioned JPEG print option screen 57 (FIG. 2D). In other words, a case of displaying the option screen when a PDF display screen 65 and a case of displaying the option screen when a JPEG display screen 53 is being displayed are different from each other in their option items.

For example, in a case where an image corresponding to a JPEG data item is a photo image, a selection of a paper type is an important option item. According to the JPEG print option screen 57 shown in FIG. 2D, since the option item 58 on the paper type which is not included in the PDF print option screen 74 is included, the user can easily set an option value for the paper type. In this case, the user can visibly recognize appropriate option items according to a print object image, and the operability when the print options are set is good.

Figure 4:
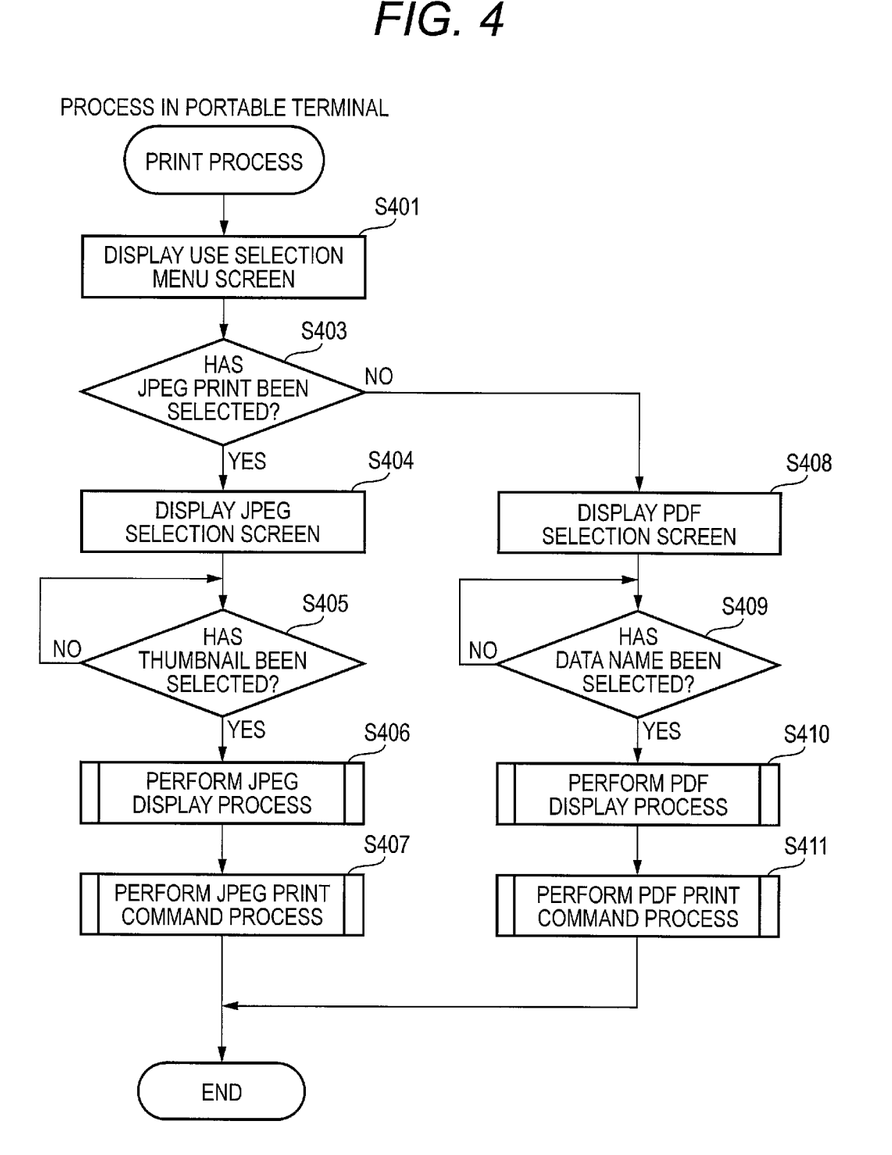
FIG. 4 is a flow chart illustrating a print process.

FIG. 4 is a flow chart illustrating a print process which is performed by the portable terminal 10. This print process starts if the present application 14b is activated by the OS 14a. Each step shown in flow charts of FIGS. 4 to 8 will be described as a step which the present application 14b makes the CPU 11 perform, with/without using the functions of the OS 14a or the like.

However, some of steps of each flow chart may be replaced with steps which the OS 14a or other applications make the CPU 11 perform. Alternatively, some of the steps of each flow chart may be replaced with steps which are implemented by operation of hardware provided in the portable terminal 10 without involvement of the CPU 11.

In STEP S401, the CPU 11 makes the LCD 18 display the use selection menu screen 51 (FIG. 2A). If the user selects the JPEG print on the use selection menu screen 51 (Yes in STEP S403), in STEP S404, the CPU 11 makes the LCD 18 display the JPEG selection screen 52 (see FIG. 2B). Then, until a selection of any thumbnail is input (in a case of No in STEP S405), the CPU 11 stands by.

If a selection of a thumbnail is input (Yes in STEP S405), in STEP S406, the CPU 11 performs a JPEG display process (shown in FIG. 5A) on a JPEG data item which corresponds to the selected thumbnail and is a object data item, so as to display a preview image of the object data item. Then, if a print instruction is input, the CPU 11 performs a JPEG print command process (shown in FIG. 5B) in STEP S407, and finishes the print process.

Figure 5A:
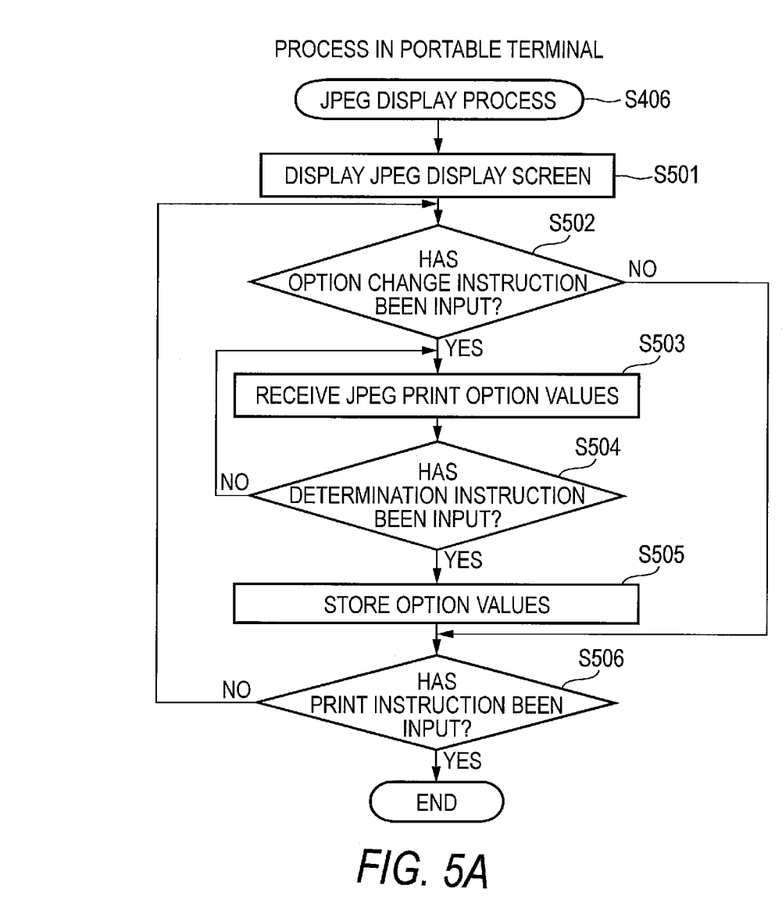
FIG. 5A is a flow chart illustrating a JPEG display process.

Now, the JPEG display process (STEP S406) shown in FIG. 5A and the JPEG print command process (STEP S407) shown in FIG. 5B will be described. FIG. 5A is a flow chart illustrating the JPEG display process. This JPEG display process is a process of displaying the JPEG display screen 53 (FIG. 2C).

In STEP S501, the CPU 11 makes the LCD 18 display the JPEG display screen 53 (FIG. 2C) including the JPEG preview image 54. If the user touches the option button 55 to input an option change instruction (Yes in STEP S502), in STEP S503, the CPU 11 makes the LCD 18 display the JPEG print option screen 57 (FIG. 2D) so as to receive print option values.

Then, until the determination button 60 of the JPEG print option screen 57 is touched (in a case of No in STEP S504), the CPU 11 repeats the process from STEP S503. If the user touches the determination button 60 (Yes in STEP S504), in STEP S505, the CPU 11 stores the received option values in the JPEG print option memory 20d, and displays the JPEG display screen 53 again.

After the received option values are stored in STEP S505, or if it is determined in STEP S502 that any option change instruction has not been input (No in STEP S502), until any print instruction is input (in a case of No in STEP S506), the CPU 11 repeats the process from STEP S502, and if a print instruction is input (Yes in STEP S506), the CPU 11 finishes the JPEG display process. If the print instruction is received, in STEP S407, the CPU 11 performs a JPEG print command process shown in FIG. 5B.

Figure 5B:
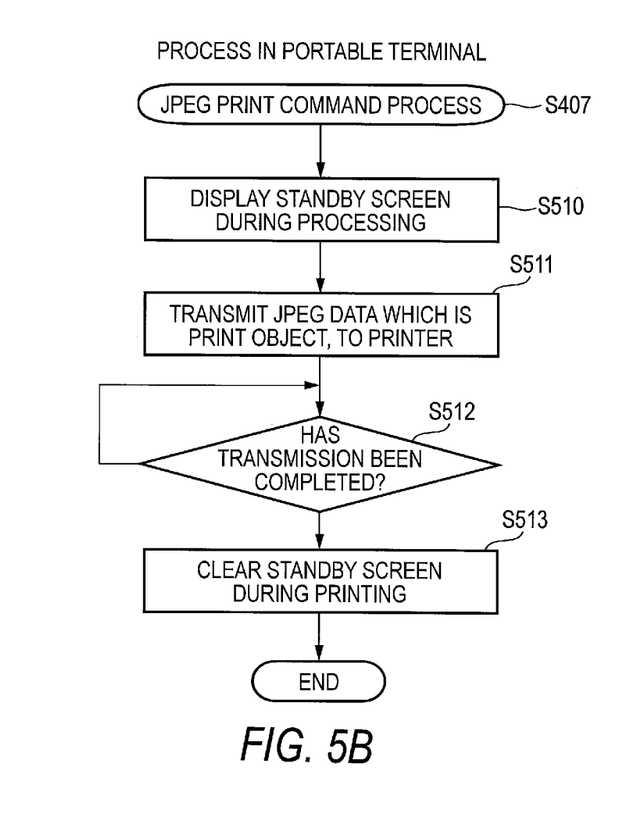
FIG. 5B is a flow chart illustrating a JPEG print command process.

FIG. 5B is a flow chart illustrating the JPEG print command process. This process is for transmitting a print command to the device 30 such that the device 30 prints the JPEG data corresponding to the JPEG preview image 54 for which the print instruction has been input. In STEP S510, the CPU 11 makes the LCD 18 display a standby screen during printing (not shown). Then, in STEP S511, the CPU 11 transmits the JPEG data item, which is the print object item, from the wireless LAN transceiver 15 to the device 30 designated by the option values stored in the JPEG print option memory 20d.

Until the transmission is completed (in a case of No in STEP S512), the CPU 11 stands by, and if the transmission is completed (Yes in STEP S512), the CPU 11 clears the standby screen during printing (not shown) from the LCD 18 in STEP S513, and finishes the JPEG print command process. Further, the device 30 prints the JPEG data received from the portable terminal 10.

Referring to FIG. 4 again, the description of the print process will be continued. In a case where the user selects the PDF print on the use selection menu screen 51 (FIG. 3A) in the process of STEP S403 (No in STEP S403), in STEP S408, the CPU 11 makes the LCD 18 display the PDF selection screen (FIG. 3B). Then, until any data name is selected (in a case of No in STEP S409), the CPU 11 stands by. If a data name is selected (Yes in STEP S409), in STEP S410, the CPU 11 performs the PDF display process (shown in FIG. 6) on the PDF data item having the selected data name, so as to display a preview image of the object data. Then, if a print instruction is input, the CPU 11 performs a PDF print command process (shown in FIG. 8) in STEP S411, and finishes the print process.

Figures 6, 6A:
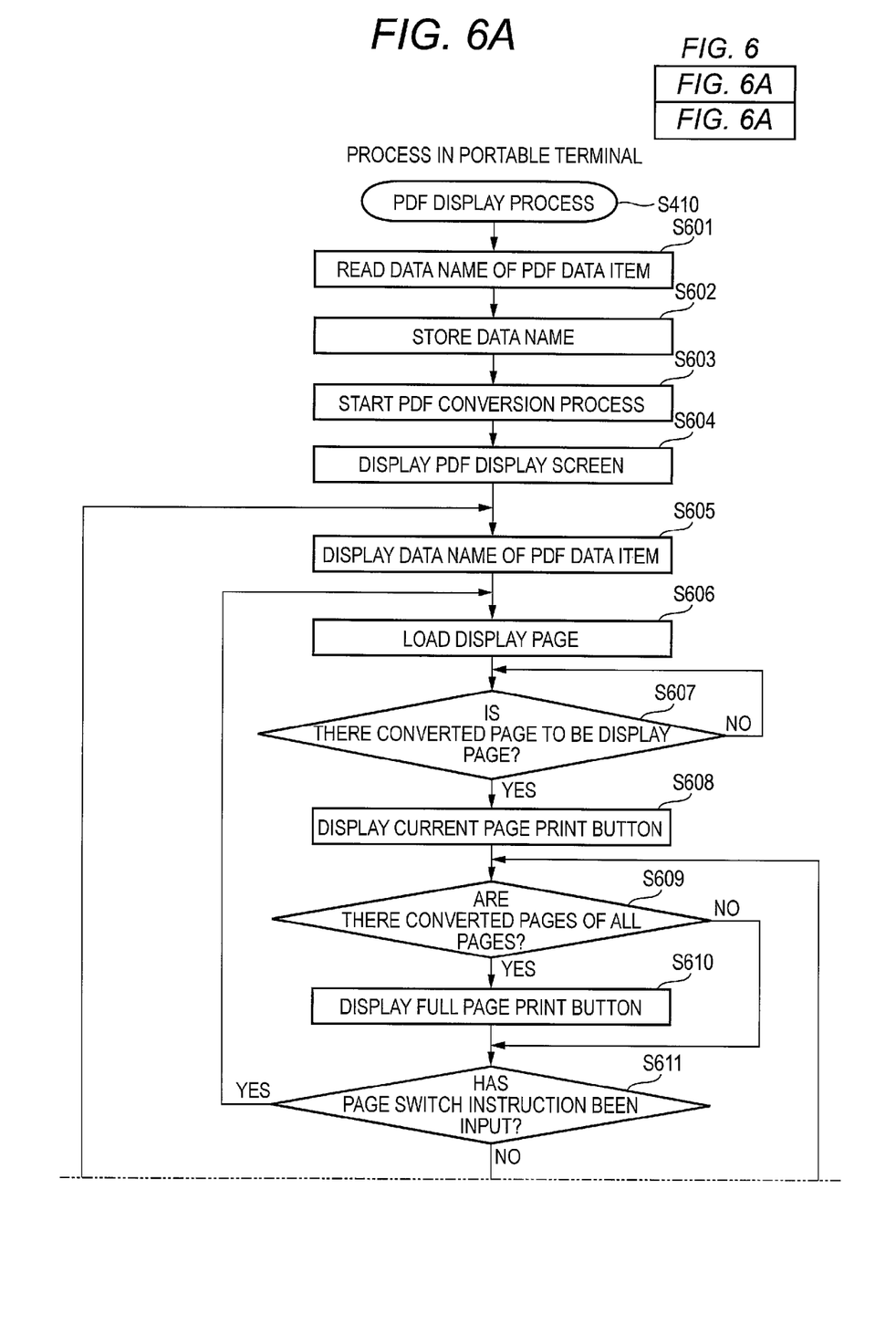
FIGS. 6A and 6B show a flow chart illustrating a PDF display process.
Figure 6B:
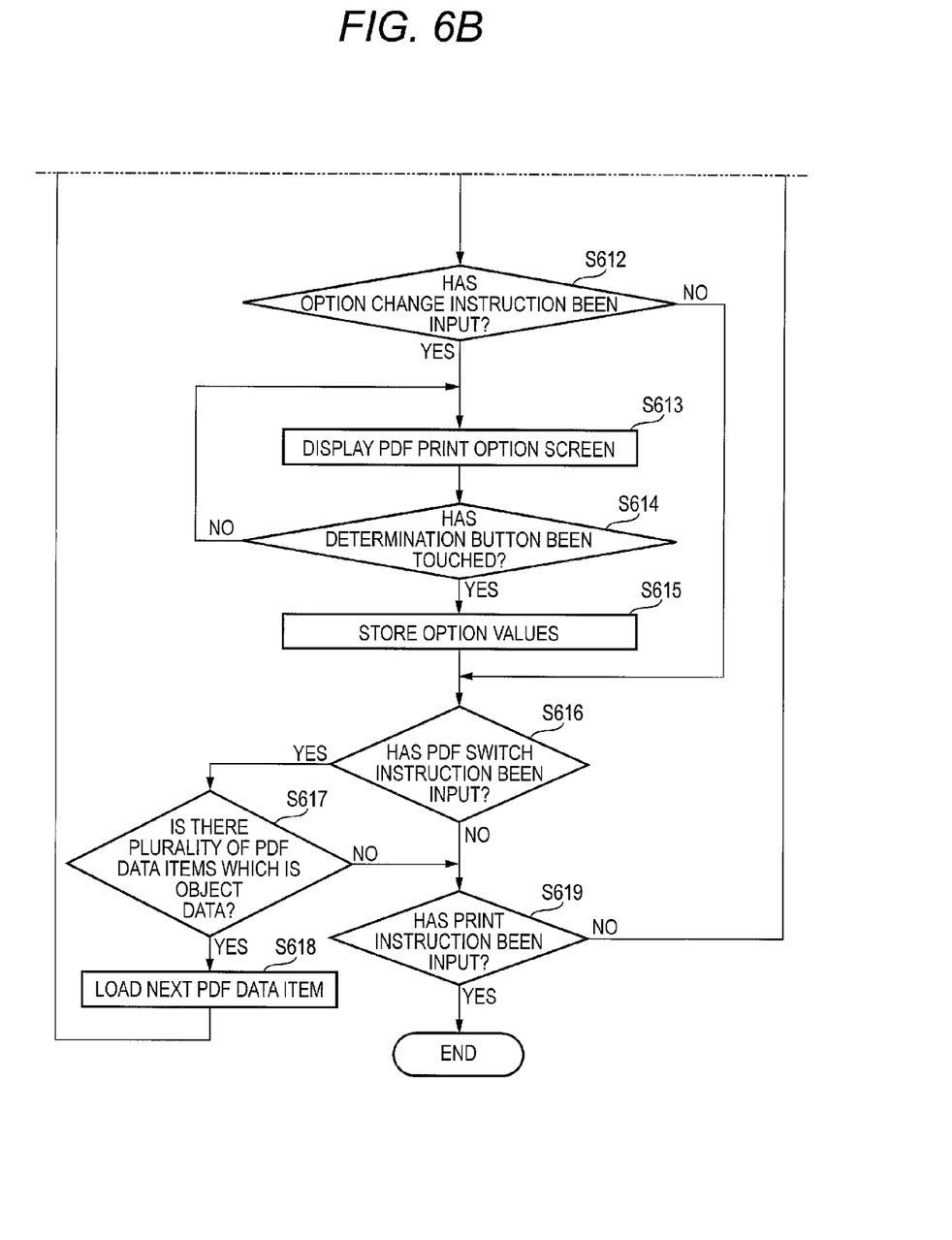

FIG. 6 is a flow chart illustrating the PDF display process (STEP S410). This process is for displaying the PDF display screen 65 (FIG. 3C). In STEP S601, the CPU 11 reads the data name of a PDF data item which is object data, from the file management memory 20a. Then, in STEP S602, the CPU 11 stores the data name in the data name memory 20b. If there is a plurality of PDF data items as the object data, the CPU 11 stores all data names in the data name memory 20b.

In STEP S603, the CPU 11 starts a PDF conversion process. Specifically, the CPU 11 makes a request to the OS 14a to activate a sub-thread for performing the PDF conversion process in parallel with the print process, and performs the PDF conversion process in the sub-thread. Therefore, it is possible to perform the PDF conversion process (STEP S603) which may require a large amount of time, separately from the PDF display process (STEP S410).

Figure 7:
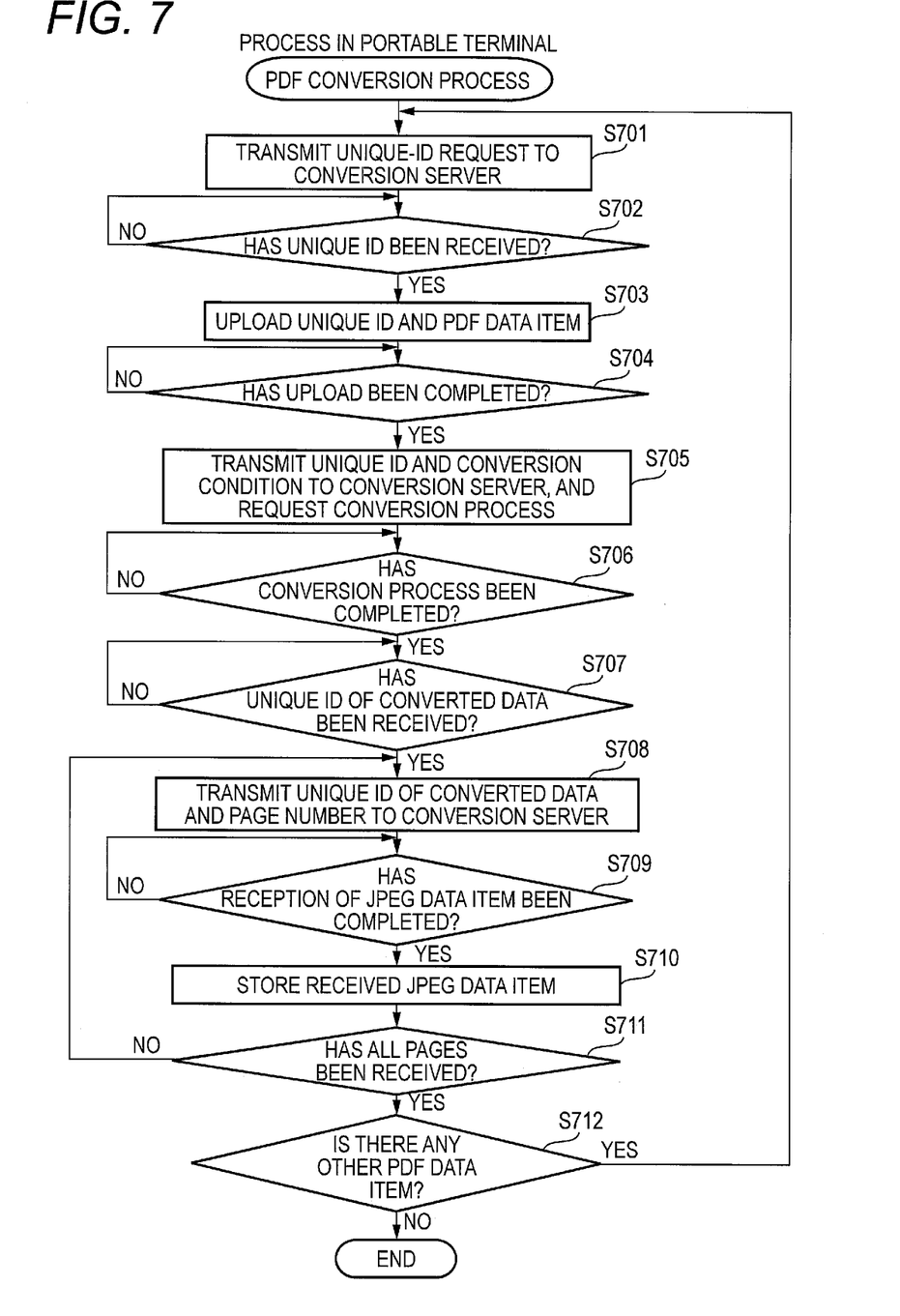
FIG. 7 is a flow chart illustrating a PDF conversion process.

Now, the PDF conversion process (STEP S603) will be described with reference to a flow chart shown in FIG. 7. FIG. 7 is a flow chart illustrating the PDF conversion process. This PDF conversion process is for converting the PDF data item into an JPEG data item in the conversion server 300. First, in STEP S701, the CPU 11 transmits a unique-ID request from the telephone network communication unit 22 to the conversion server 300. Then, until a unique ID is received (in a case of No in STEP S702), the CPU 11 stands by.

If a unique ID is received (Yes in STEP S702), in STEP S703, the CPU 11 transmits (uploads) the unique ID and the PDF data item which is the object, from the telephone network communication unit 22 to the conversion server 300 by the telephone network communication unit 22.

Then, until the upload is completed (in a case of No in STEP S704), the CPU 11 stands by. If the upload is completed (Yes in STEP S704), in STEP S705, the CPU 11 transmits the unique ID and a conversion condition from the telephone network communication unit 22 to the conversion server 300, and makes a request to the conversion server 300 to convert the PDF data item specified by the unique ID, into a JPEG data item.

If receiving the conversion process request, the conversion server 300 converts the first uploaded PDF data item so as to generate a JPEG data item. In a case where the PDF data item which is the conversion process object includes a plurality of pages, the conversion server 300 generates a plurality of JPEG data items. Then, each JPEG data item is stored in association with a page number of data of the PDF data item used for generating the corresponding JPEG data item. If the generation of the JPEG data items is completed, the conversion server 300 notifies the completion of the conversion process to the portable terminal 10. In the present embodiment, the number of pages included in the PDF data item is included in the conversion-process completion notification, which is notified to the portable terminal 10.

Meanwhile, until any conversion-process completion notification is received (in a case of No in STEP S706), the CPU 11 stands by. If a conversion-process completion notification is received (Yes in STEP S706), until the unique ID of the converted data is received from the conversion server 300 (in a case of No in STEP S707), the CPU 11 stands by. If the unique ID of the converted data is received (Yes in STEP S707), in STEP S708, the CPU 11 transmits the unique ID of the converted data and the page number from the telephone network communication unit 22 to the conversion server 300.

Then, the conversion server 300 transmits the JPEG data item, associated with the page number received from the portable terminal 10, of the converted data (JPEG data items) corresponding to the unique ID received from the portable terminal 10, to the portable terminal 10.

Then, until the reception of the JPEG data items from the conversion server 300 is completed (in a case of No in STEP S709), the CPU 11 stands by. If the reception of the JPEG data item is completed (Yes in STEP S709), in STEP S710, the CPU 11 stores the JPEG data item received from the conversion server 300, in the file management memory 20a, in association with the data name of the PDF data item, which is the source of the corresponding JPEG data item, of the data names of the PDF data items stored in the data name memory 20b. For example, a management ID assigned to each data name stored in the data name memory 20b is stored in association with a corresponding JPEG data item such that the data name and the JPEG data item are associated with each other.

Further, the page number transmitted to the conversion server 300 is stored in association with the JPEG data item. For example, if a JPEG data item is acquired in response to '01' transmitted as the page number, the page number '01' is included in the data name of the JPEG data item, which is stored. Therefore, it is possible to store the page number of each page included in the PDF data item, in association with a JPEG data item generated by converting the data of the corresponding page.

Until all pages are received (in a case of No in STEP S711), the CPU 11 repeats the PDF conversion process from STEP S708 in which CPU 11 transmits the page number and unique ID of the next page to the conversion server 300 and requests a JPEG data item corresponding to the next page from the conversion server 300. Therefore, in the case where the PDF data item transmitted to the conversion server 300 includes data of a plurality of pages, a plurality of JPEG data items is received from the conversion server 300, and is stored in association with the same data name.

After the reception of the JPEG data items of all pages is completed (Yes in STEP S711) while the process is repeated, if there is any other PDF data item which is a object data (Yes in STEP S712), the CPU 11 repeats the PDF conversion process from the STEP S701, and if there is no PDF data item which is a object data (No in STEP S712), the CPU 11 finishes the PDF conversion process.

Referring to FIG. 6 again, the description of the PDF display process is continued. If the above-mentioned PDF conversion process starts in STEP S603, in STEP S604, the CPU 11 makes the LCD 18 display the PDF display screen 65 (FIG. 3C). At this timing, the PDF preview image 67 is not displayed, and in STEP S605, the CPU 11 displays the data name 66 of the PDF data item, stored in the data name memory 20b in the process of STEP S602, on the PDF display screen 65.

In STEP S606, the CPU 11 loads the JPEG data item to be a display page. Until the download of the JPEG data item to be the display page is completed (In a case of No in STEP S607), the CPU 11 stands by. If there is the JPEG data item to be the display page (Yes in STEP S607), in STEP S608, the CPU 11 generates a PDF preview image 67 from the corresponding JPEG data item, and displays the PDF preview image 67 and the current page print button 71. Then, if there are JPEG data items of all pages (Yes in STEP S609), in STEP S610, the CPU 11 displays the full page print button 72 on the PDF display screen 65 (FIG. 3C), and if there are not JPEG data items of all pages (No in STEP S609), the CPU 11 proceeds to the process of STEP S611.

Then, if the user touches the page switch buttons 68 to input an image switch instruction (Yes in STEP S611), the CPU 11 repeats the PDF display process from STEP S606 to make the LCD 18 display another PDF preview image 67.

Meanwhile, if the user does not touch the page switch buttons 68 (No in STEP S611), and touches the option button 70 on the PDF display screen 65 (yes in STEP S612), in STEP S613, the CPU 11 makes the LCD 18 display the PDF print option screen 74 (FIG. 3F).

Then, until the determination button 77 of the PDF print option screen 74 is touched (in a case of No in STEP S614), the CPU 11 repeats the PDF display process from STEP S613, and if the determination button 77 is touched (Yes in STEP S614), in STEP S615, the CPU 11 stores the option values 76 in the PDF print option memory 20c, and displays the PDF display screen 65 again.

In a case where the user touches the PDF switch button 69 to input a PDF switch instruction (Yes in STEP S616), if there is a plurality of PDF data items which is the object data (Yes in STEP S617), in STEP S618, the CPU 11 loads the next PDF data item (the first display page of another PDF data item different from the PDF data item including the displayed page), and performs the PDF display process from STEP S605 on the next PDF data item.

Meanwhile, in a case where any PDF switch instruction is not input (No in STEP S616) or in a case where there is not a plurality of PDF data items which is the object data (No in STEP S617), if the user touches the current page print button 71 or the full page print button 72 to input a print instruction (Yes in STEP S619), the CPU 11 finishes the PDF display process, and if any print instruction is not input (No in STEP S619), the CPU 11 repeats the process from STEP S609. In the case where the print instruction is input (Yes in STEP S619), the CPU 11 performs a PDF print command process shown in FIG. 8.

Figure 8:
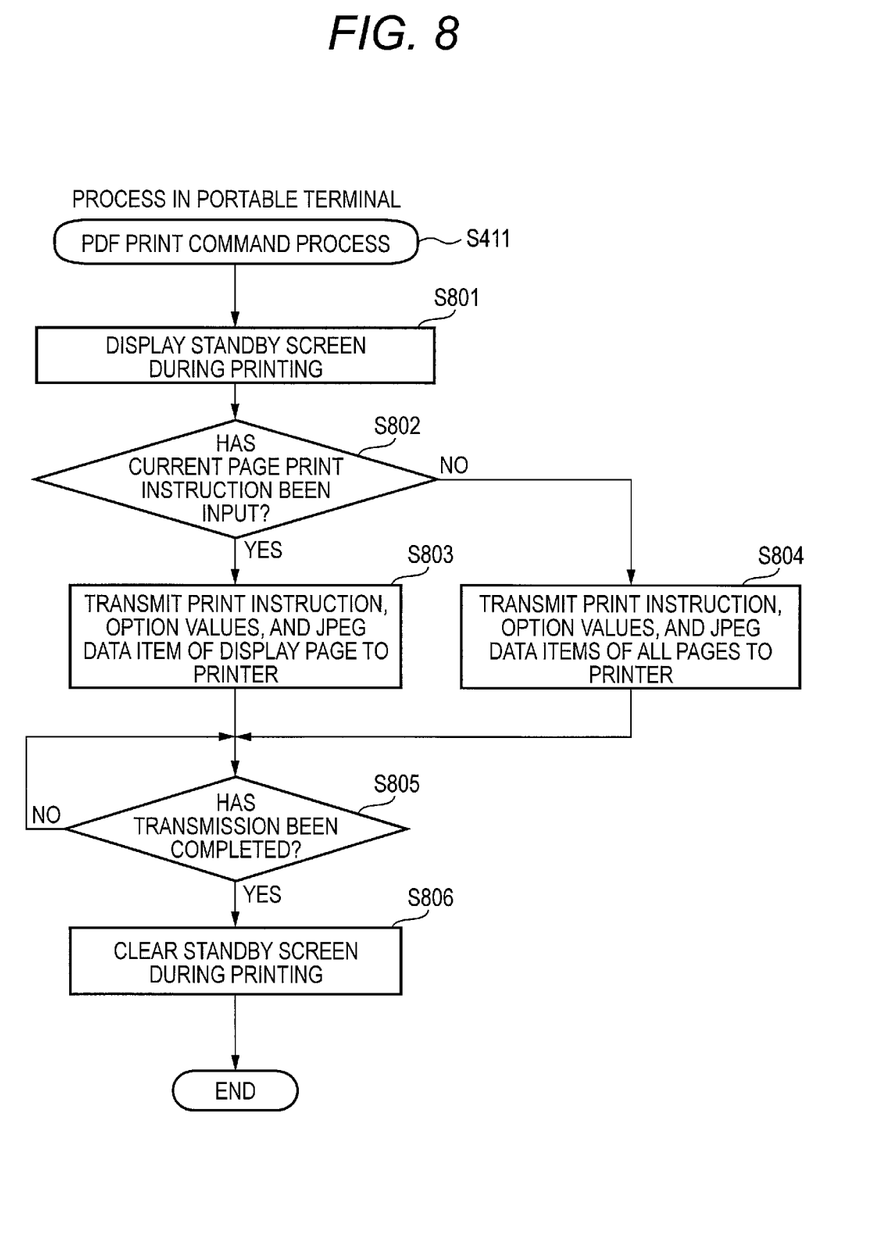
FIG. 8 is a flow chart illustrating a PDF print command process.

FIG. 8 is a flow chart illustrating the PDF print command process. This PDF print command process is for transmitting a print command to the device such that the device prints the JPEG data item corresponding to the PDF preview image 67 for which the print instruction has been input.

In STEP S801, the CPU 11 makes the LCD 18 display the standby screen during printing (not shown). Then, if a current page print instruction is input (Yes in STEP S802), in STEP S803, the CPU 11 transmits a print instruction, the option values, and the JPEG data item corresponding to the currently displayed PDF preview image 67, from the wireless LAN transceiver 15 to the device 30 designated by the option values stored in the PDF print option memory 20c.

Meanwhile, if a full page print instruction is input (No in STEP S802), in STEP S804, the CPU 11 transmits a print instruction, the option values, the JPEG data item corresponding to the currently displayed PDF preview image 67, and the other JPEG data items originated from the same PDF data as that of the JPEG data item, from the wireless LAN transceiver 15 to the device 30 designated by the option values stored in the PDF print option memory 20c.

In this case, if the determination button 77 is touched in a state where there is a mark in the check box on whether to reflect the option values only to the current PDF data item, as shown in FIG. 3F, there are the option values 76, associated with the JPEG data item corresponding to the currently displayed PDF preview image 67 on the PDF display screen 65 and all JPEG data items associated with that JPEG data item (all JPEG data items associated with the data name of the PDF data item), stored in the PDF print option memory 20c. Therefore, it is possible to instruct the device 30 to print all JPEG data items associated with the data name of the PDF data item on basis of the same option values 76.

Then, until the transmission is completed (in a case of No in STEP S805), the CPU 11 stands by, and if the transmission is completed (Yes in STEP S805), the CPU 11 clears the standby screen during printing from the LCD 18 in STEP S806, and finishes the PDF print command process. Then, the device 30 prints the JPEG data items received from the portable terminal 10.

Each of the print option unit, the transmitting unit, the receiving unit, the reception unit, the acquiring unit, and the display unit, the transmitting unit and the first display unit may be a single piece of hardware, or hardware which operates by executing the programs according to the aspect of the present disclosure or programs such as an operating system other than the programs of the aspect of the present disclosure. Alternatively, each of those units may be software which is executed by a combination of processes according to a plurality of programs. Also, each of the above-mentioned storing unit and the storing unit may be a memory, such as the flash memory 14, built in the portable terminal 10.

Although the aspect of the present disclosure has been described on the basis of the embodiments, it is easily inferable that the present invention is not limited to the above-mentioned embodiments, but may be variously modified for improvement without departing from the scope of the invention.

In the above-mentioned embodiment, the JPEG format has been exemplified as a first format, and the PDF format has been exemplified as a second format. However, the present invention is not limited thereto. Various formats such as a PNG format, a GIF format, a BMP format, a DOC format, and an XLS format can correspond to examples of the first format or the second format. For example, the first format may be a format which the device control application 14b cannot directly process, and the second format may be a format which the device control application 14b can directly process.

In the above-mentioned embodiment, a case where one JPEG data item is designated as the object data has been described. However, the present invention can also be applied to a case where a plurality of JPEG data items is designated as the object data.

In the above-mentioned embodiment, the page switch buttons 68 are composed of images. However, the page switch buttons 68 may be composed of text strings.

In the above-mentioned, the portable terminal 10 reads the data name of a PDF data item and stores the data name of the PDF data item in the memory card 20. Alternatively, the portable terminal 10 may be configured to acquire a data name of a PDF data item from the conversion server 300, and store the data name of the PDF data item in association with a JPEG data item generated by converting the PDF data item.

In the above-mentioned embodiments, the portable terminal 10 having a call function is an example of the information processing apparatus. However, examples of the information processing apparatus may include various apparatuses without a call function, such as a personal computer and a digital camera.

Also, a server to which the portable terminal 10 uploads data, and a server which converts the data and provides the converted data to the portable terminal 10 may be physically different apparatuses.

In the above-mentioned embodiment, in the data name 66 of the PDF display screen 65, the data name of the source PDF data item is displayed. However, together with the data name of the PDF data item, the icon 63, the generation date and time, the volume, and the like which are displayed on the PDF selection screen 62 may be displayed. Therefore, it is possible to make the user more clearly recognize the relation between the PDF preview screen 67 and the PDF data item which is the source of the PDF preview screen 67.

In the above-mentioned embodiment, the data name 66 including the page number corresponding to the PDF preview screen 67 is displayed. However, the page number may be displayed separately from the data name 66. For example, separately from the data name 66, the page number may be displayed in a form of '(PAGE NUMBER)/(TOTAL NUMBER OF PAGES)'.

Further, in the above-mentioned embodiment, the portable terminal 10 is connected to the Internet 200 through the portable-phone network 100 by the telephone network communication unit 22. However, the present invention is also applicable to a case where the portable terminal 10 is connected to the Internet 200 through the access point 50 by the wireless LAN transceiver 15 for saving the cost for communication.

What is claimed is:

1. A non-transitory computer readable recording medium storing an information processing program to be executed by a computer of an information processing apparatus including a transmitting unit, a receiving unit, a storing unit storing a plurality of first-kind data items stored therein in association with a data name, a reception unit for receiving whether to print a first-kind data item which has a format capable of storing a plurality of pages of first format data in one file or a second-kind data item which has a format capable of storing second format data in one file, and a display unit, the information processing program comprising:

a transmission control instruction that causes, when the reception unit receives a print request of the first-kind data item, the transmitting unit to transmit the first-kind data item from the storing unit;

a second-kind data request control instruction that causes the transmission unit to transmit a request, including page number information, for requesting the second-kind data item which is obtained by converting one page among the plurality of pages included in the transmitted first-kind data item into the second format data, the one page corresponding to the page number information;

a second-kind data storage control instruction that causes, when the transmission unit transmits the first-kind data item and the reception unit receives the second-kind data item corresponding to the one page in response to the transmitted request, the storing unit to store the received second-kind data item in association with the data name of the first-kind data item corresponding to the received second-kind data item and the page number information; and a first display control instruction that causes the display unit to display a display image, wherein the display image comprises simultaneously displaying:

an image generated from the second-kind data item stored in the storing unit, and an image representing the data name and the page number information, corresponding to the second-kind data item, of data names of the first-kind data items.

2. The non-transitory computer readable recording medium according to claim 1, wherein the information processing program further includes a second display control instruction that makes the display unit to display, as the display image, the image generated from the second-kind data item acquired from the storing unit storing a plurality of second-kind data items in association with the data name and the page number information, in a case where the reception unit receives the print of the second-kind data item, and the first display control instruction causes the display unit to display the display image in a display format different from that of the display image which the second display control instruction causes the display unit to display.

3. The non-transitory computer readable recording medium according to claim 2, wherein the information processing program further includes:

a data-name display control instruction that causes the display unit to display a data-name display screen for displaying the data names of the plurality of first-kind data items stored in the storing unit; and a thumbnail display control instruction that causes the display unit to display a thumbnail display screen for displaying the thumbnails of the plurality of second-kind data items stored in the storing unit, in a display format which does not include the data names of the plurality of second-kind data items, if the reception unit receives an instruction designating the first-kind data item corresponding to the data name of the data-name display screen after the display unit displays the data-name display screen, the transmission control instruction causes the transmitting unit to transmit the first-kind data item designated by the instruction, and the second display control instruction causes the display unit to display the display image in the display format which does not include the data name corresponding to the second-kind data item acquired through the thumbnail display screen.

4. The non-transitory computer readable recording medium according to claim 1, wherein the second-kind data storage control instruction causes the storing unit to store the plurality of pages of second-kind data items, received by the receiving unit, in association with the data name of the first-kind data item and the page number information, and the information processing program further includes a print-instruction-image display control instruction that causes the display unit to display a print instruction object, representing an instruction to print all of the plurality of pages of second-kind data items stored in association with the data name of the first-kind data item, on the same screen as a screen on which a display image using one second-kind data item of the plurality of second-kind data items is displayed.

5. The non-transitory computer readable recording medium according to claim 1, wherein the second-kind data storage control instruction causes the storing unit to store the plurality of pages of second-kind data items, received by the receiving unit, in association with the data name of the first-kind data item and the page number information, and the information processing program further includes a print-option reception control instruction that causes the computer to set print options for one second-kind data item of the plurality of second-kind data items as print options for all of the plurality of second-kind data items stored in association with the name of the first-kind data item.

6. The non-transitory computer readable recording medium according to claim 1, wherein the first display control instruction causes the display unit to display the data name including an extension representing that the corresponding data item has the first format.

7. An information processing apparatus comprising:

a reception unit configured to receive whether to print a first-kind data item which has a format capable of storing a plurality of pages of first format data in one file or a second-kind data item which has a format capable of storing second format data in one file;

a storing unit configured to store a plurality of the first-kind data items in association with a data name;

an acquiring unit configured to acquire the first-kind data item from the storing unit;

a transmission control unit configured to control a transmitting unit to transmit the first-kind data item acquired by the acquiring unit when the reception unit receives a print request of the first-kind data item;

a second-kind data request control unit that control the transmission unit to transmit a request, including page number information, for requesting the second-kind data item which is obtained by converting one page among the plurality of pages included in the transmitted first-kind data item into the second format data, the one page corresponding to the page number information;

a second-kind data storage control unit configured to control the storing unit to, when the transmission unit transmits the first-kind data item and the reception unit receives the second-kind data item corresponding to the one page in response to the transmitted request, store the received second-kind data item in association with the data name of the first-kind data item corresponding to the received second-kind data and the page number information; and a first display control unit configured to control a display unit to display a display image, wherein the display image comprises simultaneously displaying:

an image generated from the second-kind data item stored in the storing unit, and an image representing the data name and the page number information, corresponding to the second-kind data item, of data names of the first-kind data items.

8. The information processing apparatus according to claim 7, further comprising a second display control unit configured to control the display unit to display, as the display image, the image generated from the second-kind data item acquired from the storing unit storing a plurality of second-kind data items in association with the data name, in a case where the reception unit receives the print of the second-kind data item, and the first display control unit controls the display unit to display the display image in a display format different from that of the display image which the second display control unit controls the display unit to display.

9. The information processing apparatus according to claim 8, further comprising:

a data-name display control unit configured to control the display unit to display a data-name display screen for displaying the data names of the plurality of first-kind data items stored in the storing unit; and a thumbnail display control unit configured to control the display unit to display a thumbnail display screen for displaying the thumbnails of the plurality of second-kind data items stored in the storing unit, in a display format which does not include the data names of the plurality of second-kind data items, if the reception unit receives an instruction designating the first-kind data item corresponding to the data name of the data-name display screen after the display unit displays the data-name display screen, the transmission control unit controls the transmitting unit to transmit the first-kind data item designated by the instruction, and the second display control unit controls the display unit to display the display image in the display format which does not include the data name corresponding to the second-kind data item acquired through the thumbnail display screen.

10. The information processing apparatus according to claim 7, wherein if the first-kind data item transmitted by the transmitting unit includes data of the plurality of pages, the receiving unit receives the plurality of second-kind data items each of which is associated with a page number representing a corresponding page of the first-kind data item and is stored in one file, the second-kind data storage control unit controls the storing unit to store the plurality of second-kind data items, received by the receiving unit, in association with the data name of the first-kind data item, and if the display unit displays the display image using one second-kind data item of the plurality of second-kind data items, the first display control unit controls the display unit to display a page number associated with the one second-kind data item, together with the data name of the first-kind data item.

11. The information processing apparatus according to claim 7, wherein if the first-kind data item transmitted by the transmitting unit includes data of a plurality of pages, the receiving unit receives a plurality of second-kind data items each of which is stored in one file, the second-kind data storage control unit controls the storing unit to store the plurality of second-kind data items, received by the receiving unit, in association with the data name of the first-kind data item, and the information processing apparatus further comprises a print-instruction-image display control unit configured to control the display unit to display an print instruction object, representing an instruction to print all of the plurality of second-kind data items stored in association with the data name of the first-kind data item, on the same screen as a screen on which a display image using one second-kind data item of the plurality of second-kind data items is displayed.

12. The information processing apparatus according to claim 7, wherein if the first-kind data item transmitted by the transmitting unit includes data of a plurality of pages, the receiving unit receives a plurality of second-kind data items each of which is stored in one file, the second-kind data storage control unit controls the storing unit to store the plurality of second-kind data items, received by the receiving unit, in association with the data name of the first-kind data item, and the information processing apparatus further comprises a print-option reception control unit configured to set print options for one second-kind data item of the plurality of second-kind data items as print options for all of the plurality of second-kind data items stored in association with the name of the first-kind data item.

13. The information processing apparatus according to claim 7, wherein the first display control unit controls the display unit to display the data name including an extension representing that the corresponding data item has the first format.

14. An information processing method which is performed in an information processing apparatus including a receiving unit, a storing unit storing a plurality of first-kind data items stored therein in association with a data name, a reception unit for receiving whether to print the first-kind data item which has a format capable of storing a plurality of pages of first format data in one file or the second-kind data item which has a format capable of storing second format data in one file, and a display unit, the method comprising:

transmitting the first-kind data item from the storing unit when the reception unit receives a print request of the first-kind data item;

transmitting a request, including page number information, for requesting the second-kind data item which is obtained by converting one page among the plurality of pages included in the transmitted first-kind data item into the second format data, the one page corresponding to the page number information;

when the transmission unit transmits the first-kind data item and the reception unit receives the second-kind data item corresponding to the one page in response to the transmitted request, storing the second-kind data item in association with the data name of the transmitted first-kind data item corresponding to the received second-kind data item and the page number information; and displaying, on the display unit, a display image, wherein the display image comprises simultaneously displaying:

an image generated from the second-kind data item stored in the storing unit, and an image representing the data name and the page number information, corresponding to the second-kind data item, of data names of the first-kind data items.

* * * * *